United States Patent
Onishi

(10) Patent No.: US 9,137,407 B2
(45) Date of Patent: Sep. 15, 2015

(54) POWER SUPPLY APPARATUS, IMAGE FORMING APPARATUS, POWER SUPPLY METHOD, AND PROGRAM

(71) Applicant: CANON KABUSHIKI KAISHA, Tokyo (JP)

(72) Inventor: Tetsuya Onishi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/151,358

(22) Filed: Jan. 9, 2014

(65) Prior Publication Data
US 2014/0198338 A1 Jul. 17, 2014

(30) Foreign Application Priority Data
Jan. 11, 2013 (JP) .................................. 2013-003525

(51) Int. Cl.
*H04N 1/00* (2006.01)
(52) U.S. Cl.
CPC ....... *H04N 1/00901* (2013.01); *H04N 1/00204* (2013.01); *H04N 1/00307* (2013.01); *H04N 1/00411* (2013.01); *H04N 1/00413* (2013.01); *H04N 1/00347* (2013.01); *H04N 2201/001* (2013.01); *H04N 2201/006* (2013.01); *H04N 2201/0055* (2013.01); *H04N 2201/0084* (2013.01); *H04N 2201/0094* (2013.01)

(58) Field of Classification Search
USPC ......................................................... 358/1.14
See application file for complete search history.

(56) References Cited

U.S. PATENT DOCUMENTS

| | | | |
|---|---|---|---|
| 2009/0146608 A1* | 6/2009 | Lee ............................... | 320/108 |
| 2010/0188041 A1* | 7/2010 | Mizuo ........................... | 320/108 |
| 2012/0300245 A1* | 11/2012 | Chatierjee et al. ........... | 358/1.14 |

FOREIGN PATENT DOCUMENTS

JP 2012-016170 A 1/2012

* cited by examiner

*Primary Examiner* — Ngon Nguyen
(74) *Attorney, Agent, or Firm* — Canon U.S.A., Inc. IP Division

(57) ABSTRACT

A power supply apparatus includes a display control unit configured to display external devices allowed to receive power from the power supply apparatus, an input reception unit configured to receive, from a user, an input for selecting an external device as a power supply target from among the displayed external devices, and a power supply target device identification unit configured to identify the selected external device as a power supply target.

9 Claims, 17 Drawing Sheets

FIG. 3

| DEVICE ID | POWER SUPPLY FREQUENCY (KHz) | REQUIRED POWER (mW/min) | BATTERY CHARGING STATUS (%) | POWER SUPPLY FLAG | AREA | PRIORITY FLAG | COOPERATION FLAG |
|---|---|---|---|---|---|---|---|
| ID01 | 200 | 500 | 50 | STOP | OUT | | |
| ID02 | 220 | 200 | 40 | SUPPLY | IN | PRIORITY | |
| ID03 | 300 | 100 | 30 | SUPPLY | IN | | |
| ID04 | 320 | 800 | 80 | SUPPLY | IN | | PRINT |
| ID05 | 180 | 200 | 90 | SUPPLY | IN | | |

FIG. 11

| DEVICE ID | BATTERY CHARGING STATUS (%) | POWER SUPPLY STATUS | POWER SUPPLY AREA | PRIORITY FLAG | COOPERATION FLAG |
|---|---|---|---|---|---|
| ID01 | 50 | STOP | OUT | | |
| ID02 | 40 | SUPPLY | IN | PRIORITY | |
| ID03 | 30 | SUPPLY | IN | | |
| ID04 | 80 | SUPPLY | IN | | PRINT |
| ID05 | 90 | SUPPLY | IN | | |

FIG. 13

| DEVICE ID | BATTERY CHARGING STATUS (%) | POWER SUPPLY STATUS | POWER SUPPLY AREA | PRIORITY FLAG | COOPERATION FLAG |
|---|---|---|---|---|---|
| ID01 | 50 | SUPPLY | IN | | |
| ID02 | 40 | STOP | OUT | | |
| ID03 | 30 | SUPPLY | IN | | |
| ID04 | 80 | STOP | OUT | | |
| ID05 | 90 | STOP | OUT | | |

FIG. 15

| DEVICE ID | BATTERY CHARGING STATUS (%) | POWER SUPPLY STATUS | POWER SUPPLY AREA | PRIORITY FLAG | COOPERATION FLAG |
|---|---|---|---|---|---|
| ID01 | 50 | STOP | OUT | | |
| ID02 | 40 | STOP | OUT | | |
| ID03 | 30 | STOP | OUT | | |
| ID04 | 80 | STOP | OUT | | |
| ID05 | 90 | STOP | OUT | | |

POWER SUPPLY APPARATUS, IMAGE FORMING APPARATUS, POWER SUPPLY METHOD, AND PROGRAM

BACKGROUND OF THE INVENTION

1. Field of the Invention

The present invention relates to a power supply apparatus, an image forming apparatus, a power supply method, and a program.

2. Description of the Related Art

In general, mobile terminals such as cell phones, smartphones, tablet personal computers, and notebook personal computers are equipped with their own batteries, thus eliminating the use of power cables to improve portability and pursue user-friendliness. Furthermore, there is a known technique that allows a charging apparatus to charge the battery in a non-contact (wireless) manner without any connection unit such as a connector.

Japanese Patent Application Laid-Open No. 2012-16170 discusses a device as a technique for a power supply apparatus. The device is able to detect a positional change of a power receiving apparatus and allow a display unit of a power supply apparatus to display a charging state of the power receiving apparatus having such a change.

Furthermore, multifunction peripherals (MFPs) have developed so that they can cooperate with mobile terminals such as those described above to give a desired print output and to receive a scanner input via wireless network.

Another known technique allows an MFP and a mobile terminal to cooperate with each other. Through this technique, power is supplied to the mobile terminal by wireless power supply using the MFP as a power-supplying point. This technology allows a user to perform processing without consideration of draining of a battery during cooperation between the MFP and the mobile terminal.

In the conventional technique for wireless power supply, a power supply apparatus automatically acquires a power supply protocol and the identification number of a power receiving apparatus in a power supply zone, and then automatically performs wireless power supply upon establishment of a power supply link.

However, when using the MFP as a power supply point, a mobile terminal user approaching the point to cooperate with the MFP does not always desire power supply. In other words, the conventional technique for wireless power supply has a problem in that a user may receive unnecessary power supply.

SUMMARY OF THE INVENTION

The present invention is directed to a power supply apparatus and an image forming apparatus that perform power supply upon a user's request.

According to an aspect of the present invention, a power supply apparatus includes a display control unit configured to display external devices allowed to receive power from the power supply apparatus, an input reception unit configured to receive, from a user, an input for selecting an external device as a power supply target from among the displayed external devices, and a power supply target device identification unit configured to identify the selected external device as a power supply target.

Further features of the present invention will become apparent from the following description of exemplary embodiments with reference to the attached drawings.

BRIEF DESCRIPTION OF THE DRAWINGS

FIG. 3 is a diagram illustrating a data table.

FIG. 11 is a diagram illustrating an example of display data.

FIG. 13 is a diagram illustrating an example of display data.

FIG. 15 is a diagram illustrating an example of display data.

DESCRIPTION OF THE EMBODIMENTS

Various exemplary embodiments, features, and aspects of the invention will be described in detail below with reference to the drawings.

Figure 1:
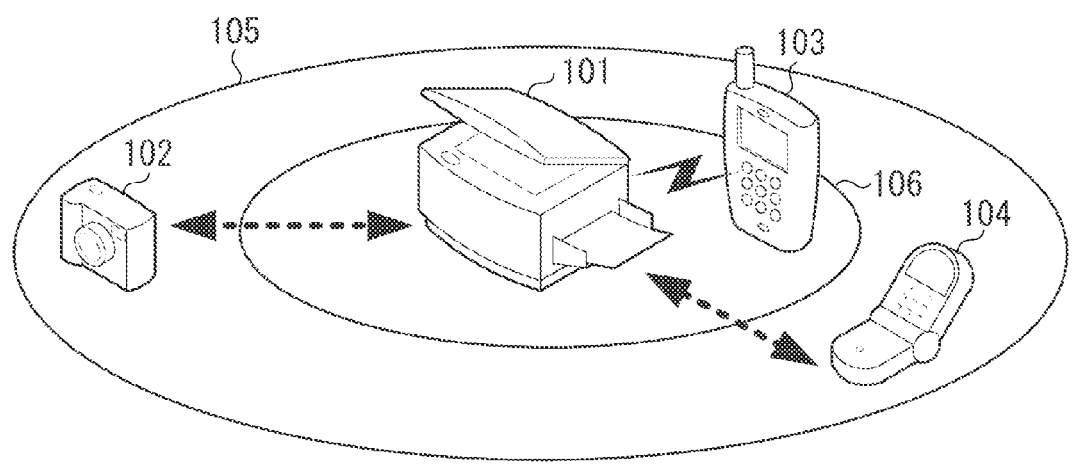
FIG. 1 is a diagram illustrating an MFP and external devices.

FIG. 1 is a diagram illustrating a digital multifunction peripheral/multifunction printer (MFP) 101 supplying power to external devices 102, 103, and 104. The MFP 101 serves as an image forming apparatus having a power supply unit.

The MFP 101 performs wireless power supply to the external devices 102, 103, and 104. The MFP 101 of the present exemplary embodiment is a system including an operation unit for allowing a user to monitor and control the wireless power supply.

The external device 102 illustrated in FIG. 1 is a digital camera. In addition, the external devices 103 and 104 are smartphones. The number and kinds of the external devices to which the MFP 101 can supply power are not limited to those of the present exemplary embodiment.

As illustrated in FIG. 1, the MFP 101 serves as a power supply point for wireless power supply. A transmissible area 105 illustrated in FIG. 1 is an area where the external devices 102 to 104 can perform wireless communication with the MFP 101. In other words, the external devices 102 to 104 can communicate with the MFP 101 when they locate within the transmissible area 105.

A power suppliable area 106 illustrated in FIG. 1 is an area where the MFP 101 can perform wireless power supply. In other words, the external devices 102 to 104 can respectively receive suitable amounts of wireless power supply from the MFP 101 when they locate within the power suppliable are 106. The power suppliable area 106 is defined by the amount of power that can be supplied by the MFP 101, that is, the power supply ability of the MFP 101.

In an example illustrated in FIG. 1, the external devices 102 and 104 locate outside the power suppliable area 106 and inside the transmissible area 105. Thus, the external devices 102 and 104 only communicate with the MFP 101. On the other hand, the external device 103 locates inside the power suppliable area 106. Thus, the external device 103 can receive power supply from the MFP 101.

The MFP 101 of the present exemplary embodiment identifies an external device as a target for power supply in response to an instruction from a user. Furthermore, the MFP 101 communicates with the external device to acquire status information that represents the state of the external device, followed by changing the boundary of the power suppliable area 106 based on the status information.

Figure 2:
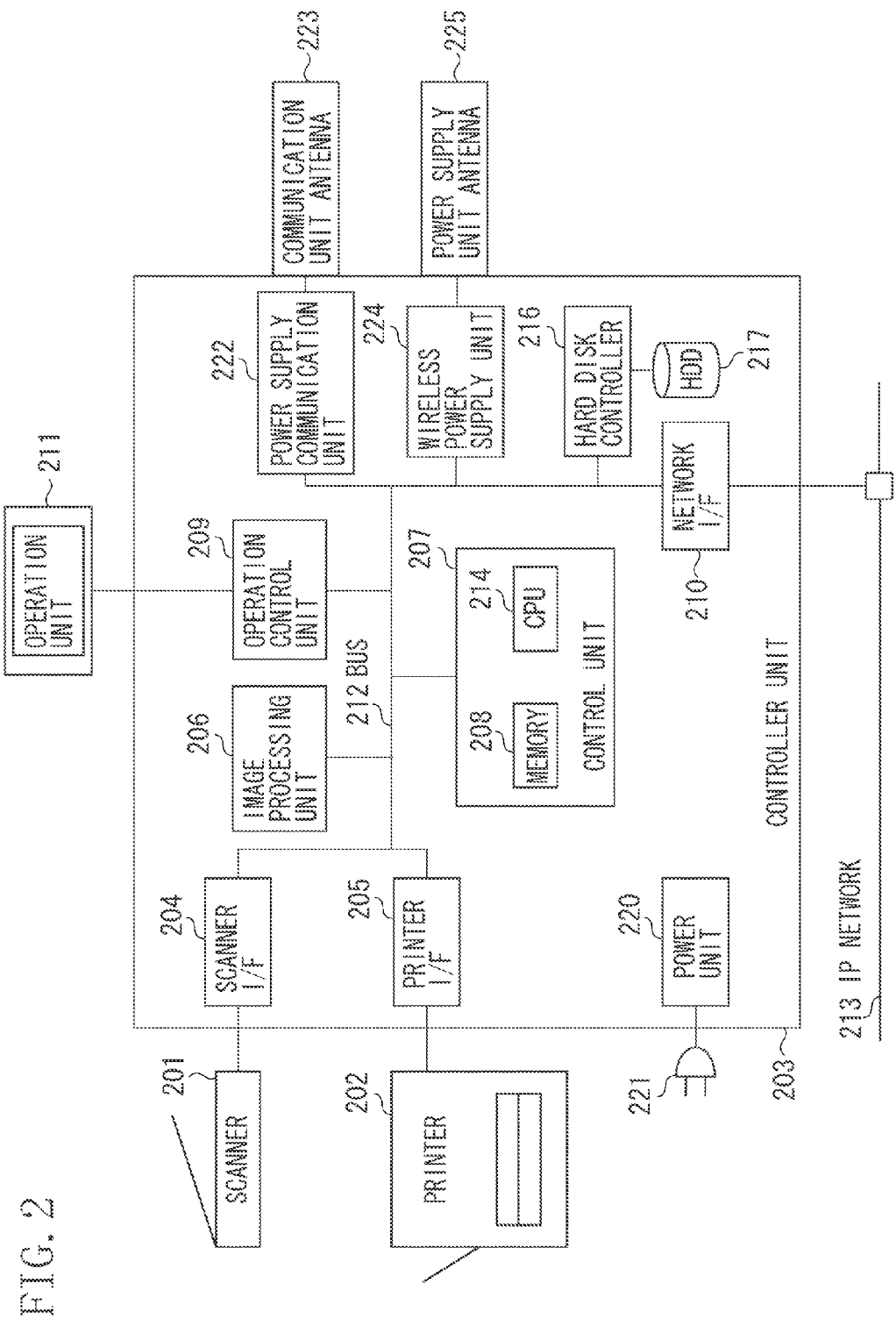
FIG. 2 is a diagram illustrating the configuration of the MFP.

FIG. 2 is a diagram illustrating the configuration of the MFP 101. The MFP 101 includes a controller unit 203, a scanner 201, a printer 202, and an operation unit 211. The scanner 201 includes a unit for reading out information from a document on a platen. In addition, the MFP 101 can mount a document feeder (not illustrated) on the scanner 201. The document feeder allows the scanner 201 to effectively read a plurality of documents.

The printer 202 has a printing function. The printer 202 includes a unit for printing out an image read by the scanner 201, an image transferred via an IP network 213, and an image stored in a hard disk drive (HDD) 217.

The operation unit 211 serves as a user interface. The operation unit 211 includes an input unit that allows the user to input an instruction, and display unit that displays information. The input unit is, for example, a unit such as a keyboard for allowing the user to input instruction data or a unit such as a pointing device for allowing the user to specify an area. The display unit is, for example, a display screen for displaying document information.

The controller unit 203 includes a scanner interface (I/F) 204, a printer interface (I/F) 205, an image processing unit 206, a control unit 207, and an operation control unit 209. The controller unit 203 also includes the HDD 217 and a hard disk controller 216. Here, the HDD 217 and the hard disk controller 216 are installed in the MFP 101 to form a storage unit. The controller unit 203 also includes a network interface (I/F) 210 and a bus 212. The network I/F 210 is an interface to the outside. The bus 212 controls every unit of the controller unit 203 and makes connections among the units. The HDD 217 is a storage device for temporary storing various kinds of data including scanned images and print images.

The image processing unit 206 performs optimal image processing for transferring an image read by the scanner 201 to each unit. For example, the image processing unit 206 transfers an image to the HDD 217. The image processing unit 206 also transfers a scanned image to an external device via the network I/F 210. The image processing unit 206 performs optimal compression on an image when transferring the image.

Furthermore, the image processing unit 206 performs image processing for obtaining print output from the printer 202. A print image source is an image read by the scanner 201, an image stored in the HDD 217, or the like. Alternatively, for example, the print image source may be a print image transferred via the IP network 213 and the network I/F 210. The image processing unit 206 performs various kinds of image processing such as expansion processing and resolution conversion processing, to suitably print out a document according to each of the image sources.

The control unit 207 controls the image processing unit 206, the scanner I/F 204, and the printer I/F 205, all of which are connected therewith via the bus 212, to handle images. The operation control unit 209 controls the operation unit 211 to convert user's instruction data into a different form that can be instructed and controlled by the control unit 207.

A power supply unit 221 plugs in a socket of an alternating current (AC) power source (commercial power source) to supply power to the entire MFP 101. A power unit 220 converts the AC voltage supplied from the power supply unit 221 into a direct current (DC) voltage, followed by supplying the DC voltage as a power source for each load. The power unit 220 includes a main power switch (SW) (not illustrated).

A power supply communication unit 222 is a communication unit for identifying and authenticating a device in communication when the MFP 101 performs wireless power supply to an external device (a power-receiving device) that desires power from the MFP 101. The power supply communication unit 222 connects to a communication unit antenna 223. The power supply communication unit 222 performs wireless communication with an external device by a wireless communication system such as neighborhood wireless communication.

A wireless power supply unit 224 is a power supply unit for performing contactless power supply to an external device. The wireless power supply unit 224 connects to a power supply unit antenna 225. The wireless power supply unit 224 supplies electric energy to the external device via the power supply unit antenna 225. Examples of the contactless power supply method include an electromagnetic induction system, an electric field/magnetic field resonance system, and a radio wave receiving system. The user can specify or change, by operating the operating unit 211, the amount of power to be supplied from the wireless power supply unit 224 to an external device, that is, the power supply ability of the wireless power supply unit 224.

The control unit 207 is responsible for entire control of the controller unit 203. The control unit 207 includes a central processing unit (CPU) 214 as the core of control. The control unit 207 includes a memory 208 such as a read-only memory (ROM) for controlling a program carried out by the CPU 214 and a work random access memory (RAM) serving as a temporary usage memory.

Furthermore, the processing described below can be carried out by the CPU 214. That is, the CPU 214 reads out programs stored in the memory 208 and executes the programs to cooperate with the memory 208 such as a work RAM used as a temporary usage memory to carry out the respective processing.

In the following processing, furthermore, an external device performs its processing in a manner similar to the MFP 101 such that the CPU of the external device reads out a program stored in its memory and executes such a program.

FIG. 3 is a diagram schematically illustrating a data table stored in the memory 208. The CPU 214 refers to and updates the data table through the processing described below. The device identification number (ID) of the data table is a unique ID of an external device to which the MFP 101 can supply power, that is, a unique ID of a power receptive device.

In addition to power supply processing described below, the MFP 101 receives device IDs from external devices when the MFP 101 cooperates with the external devices via the IP network 213 in processing such as printing or scanning.

A power supply frequency is the resonance frequency of power when the wireless power supply unit 224 supplies power to the external devices. By changing the frequency, the wireless power supply unit 224 performs wireless power supply to a specific external device. The unit of the power supply frequency in FIG. 3 is kilohertz (KHz).

In FIG. 3, required power represents the amount of power required by an external device when the external device receives wireless power supply. The unit of the required power in FIG. 3 is milliwatt per minute (mW/min). In other words, the required power is the amount of power received by the external device per minute. The CPU 214 acquires information including a power supply frequency and required power from the external device in step S602 of the processing described below (FIG. 7), followed by writing them in the data table in step S603.

Figure 8:
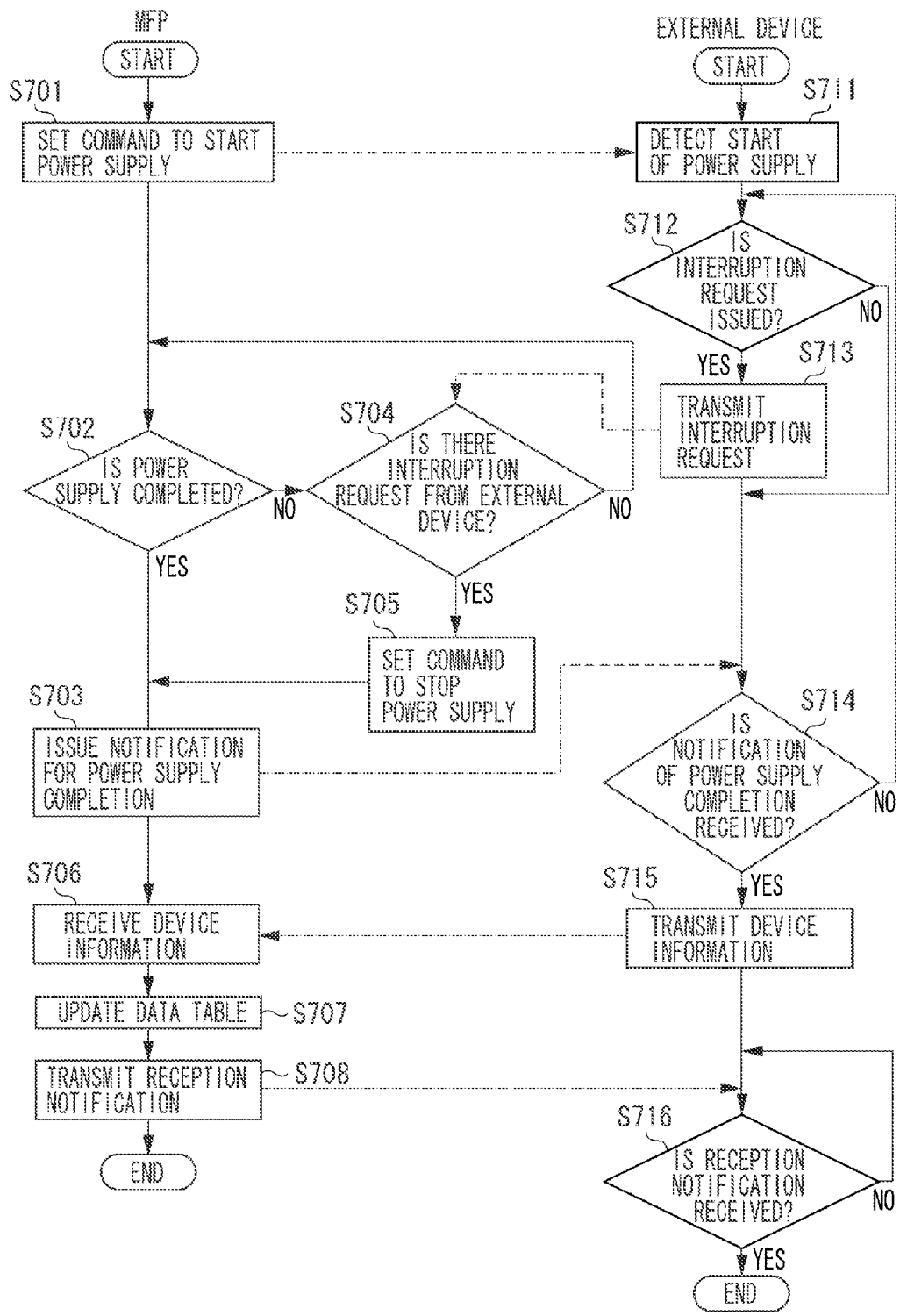
FIG. 8 is a diagram illustrating processing in a power transfer period.

In FIG. 3, area represents information indicating whether the external device locates on the outside or the inside of the power suppliable area 106. "IN" represents that the external device locates on the inside of the power suppliable area 106. "OUT" represents that the external device locates on the outside of the power suppliable area 106. The area is data acquired by the CPU 214 from the external device in step S706 of the processing described below (FIG. 8).

In FIG. 3, battery charging status is a charging amount of a battery attached to the external device. The battery charging status is data acquired by the CPU 214 from the external device in step S706 of the processing described below (FIG. 8). The unit of the charging amount in FIG. 3 is percent (%). The charging amount of the battery is 100% when fully charged.

In FIG. 3, a power supply flag is a flag that represents whether power is being supplied ("Supply") or not ("Stop"). In the case of power not being supplied, the CPU 214 sets "Stop" in the power supply flag. During the power supply, the CPU 214 sets "Supply" in the power supply flag. The details of the processing will be described below.

In FIG. 3, a priority flag represents information indicating an external device to which power is preferentially supplied. In other words, the external device corresponding to the priority flag preferentially receives power supply in comparison with other external devices. The user can operate the operation unit 211 to select a desired external device, and to set the priority flag thereto. A cooperation flag represents the external device in cooperation operation. Here, examples of the cooperation operation include scanning/printing executed by the external device and the MFP 101 via the IP network 213. When the device ID received from the external device during the cooperation operation of the MFP 101 matches the device ID on the data table, the MFP 101 associates the device ID with the cooperation flag, thereby setting the flag. Specifically, the MFP 101 sets a print flag, for example, to the external device in printing operation.

Figure 4:
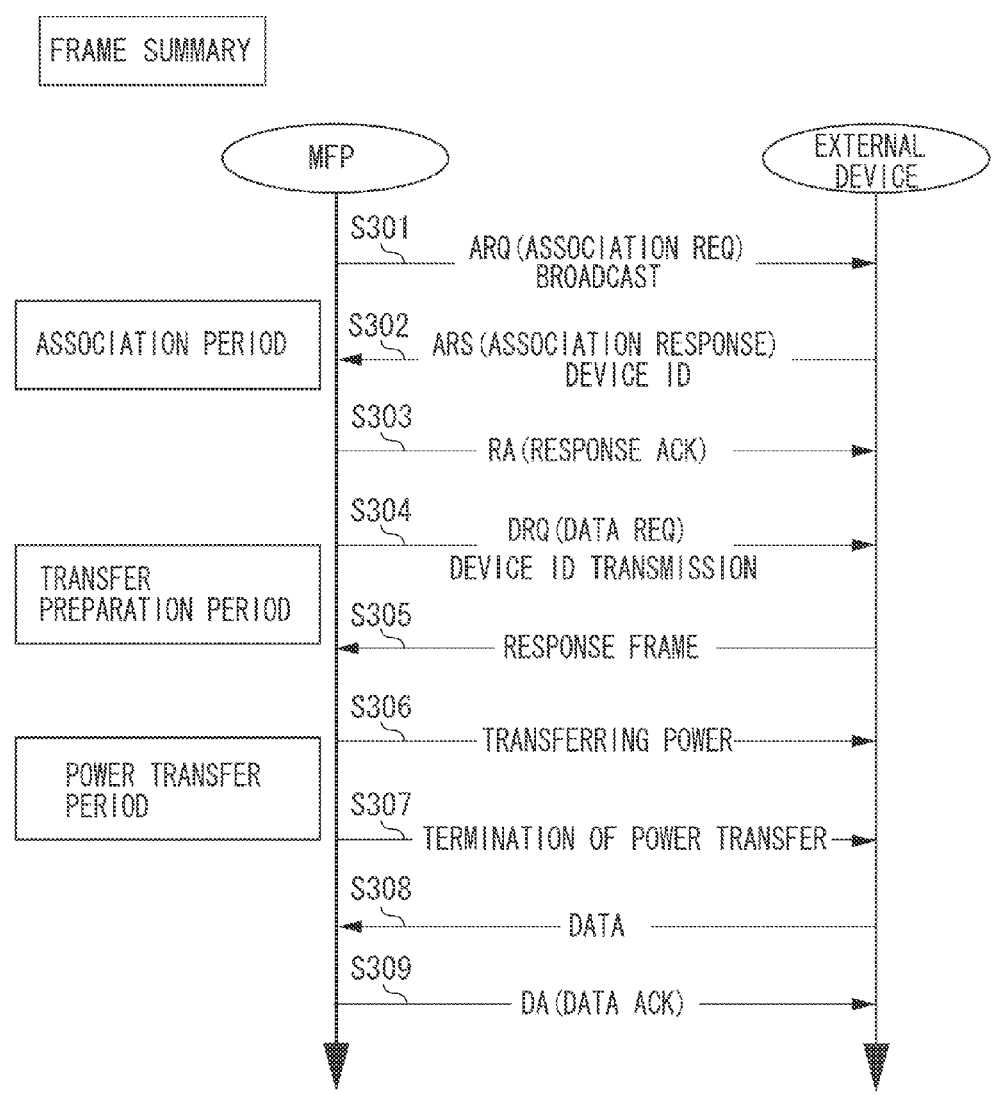
FIG. 4 is a diagram illustrating power supply processing.

FIG. 4 is a sequence diagram illustrating the power supply processing performed by the MFP 101. In the power supply processing, the MFP 101 performs wireless power supply to an external device. Even though FIG. 4 illustrates only one external device, the MFP 101 is able to communicate with a plurality of external devices.

As illustrated in FIG. 3, the power supply processing is broadly divided into steps in three periods; steps S301, S302, and S303 in an association period; steps S304 and S305 in a transfer preparation period; and steps S306, S307, S308, and S309 in a power transfer period. The MFP 101 organizes these three periods (the association period, the transfer preparation period, and the power transfer period) into one frame, and repeats the frame to perform wireless power supply.

The details of each step will be described below.

<Association Period>

In association request (ARQ) processing in step S301, the CPU 214 issues a communication command to the power supply communication unit 222 via the bus 212. The power supply communication unit 222 performs broadcast communication to each external device in response to the communication command, thereby notifying an external device requesting power supply of the start of power supply.

In association response (ARS) processing in step S302, the CPU 214 makes, via the bus 212, the power supply communication unit 222 receive a device ID from an external device requesting power supply. Then, the CPU 214 detects the external device requesting power supply by the ARS processing.

In response acknowledgement (RA) processing in step S303, the CPU 214 selects, from among the received device IDs, the device ID of an external device to which power is supplied. Then, the CPU 214 replies the device ID of the selected external device from the power supply communication unit 222 via the bus 212. Thus, the CPU 214 acknowledges power supply to the external device. At this time, an unacknowledged external device waits the ARQ processing of the next frame.

<Transfer Preparation Period>

In data request (DRQ) processing in step S304, the CPU 214 transmits, from the power supply communication unit 222 via the bus 212, the device ID of an external device to which power is supplied. Then, the CPU 214 requests the required information about the target external device therefrom, the information which is required for performing power supply. The required information includes, for example, power propagation frequency, required power of the device, and the unique information about the device.

In response frame processing in step S305, the CPU 214 makes the power supply communication unit 222 receive each piece of the information from the requested external device, and then receives the information via the bus 212. The CPU 214 stores the received information in the memory 208. The CPU 214 executes a program that causes the wireless power supply unit 224 to supply power based on the received information. For example, the CPU 214 calculates time for supplying power to the external device selected in the association period. Here, the CPU 214 defines the value of the power supply time based on a wireless supply power from the wireless power supply unit 224, the required power of the external device, and the power transfer efficiency.

<Power Transfer Period>

In transferring power processing in step S306, the CPU 214 issues a command to the wireless power supply unit 224 via the bus 212 to start power supply. The commands to be set are those for determining the power supply time and for starting power supply. In termination of power transfer in step S307, the wireless power supply unit 224 terminates the power supply when the power supply time is over. Furthermore, the CPU 214 receives a notification of power supply completion from the wireless power supply unit 224 via the bus 212. The CPU 214 causes the power supply communication unit 222 to notify the external device of termination of power supply.

In data in step S308, the CPU 214 causes the power supply communication unit 222 to receive the notification of power supply completion from the external device via the bus 212. In step S308, the CPU 214 receives data such as the amount of power received and the charging amount of a battery. Then, the memory 208 stores the data as power supply data. In data acknowledgement (DA) in step S309, the CPU 214 causes the power supply communication unit 222 to notify the external device of the receipt of the power supply data via the bus 212, completing the frame.

The CPU 214 causes the power supply communication unit 222 to communicate with the external device via the bus 212 to acquire various kinds of information from the external device during the power transfer period in step S306. In other words, the CPU 214 can suitably execute the processing of steps S308 and S309 for receiving the power supply data from the external device after execution of the transferring power processing in step S306. Therefore, when an unexpected event or the like occurs in the external device, for example, the CPU 214 can promptly receive a request such as the request for stopping power supply from the external device. In other words, the CPU 214 can promptly stop the power supply to the external device.

Figure 5:
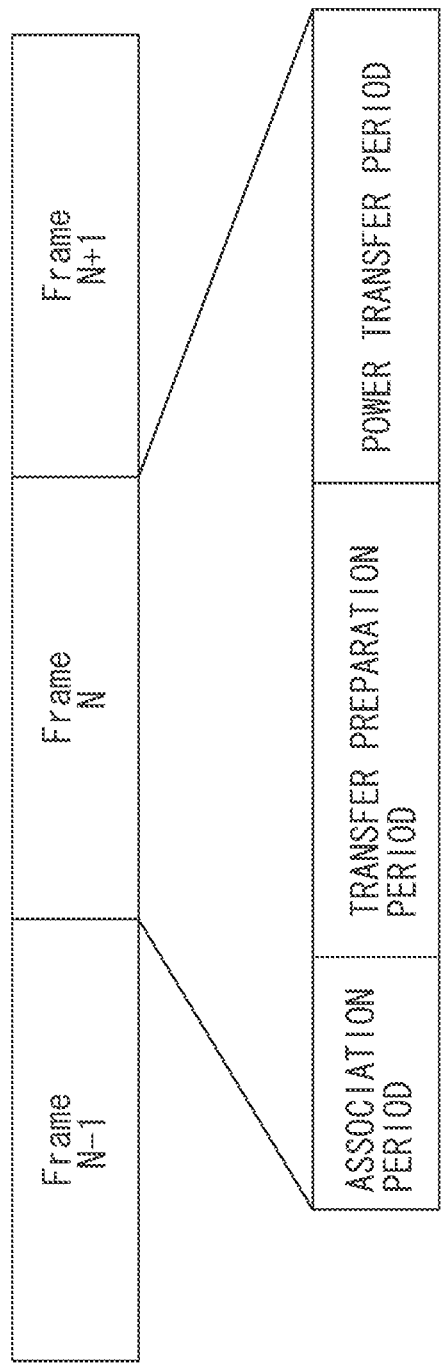
FIG. 5 is a diagram illustrating frames.

FIG. 5 is a diagram illustrating consecutive frames each including the association period in steps S301, S302, and S303, the transfer preparation period in steps S304 and S305, and the power transfer period in step S306, S307, S308, and S309.

In each frame, the MFP 101 performs power supply to different external devices authenticated in the association period in steps S301, S302, and S303. The MFP 101 performs power supply to different external devices in each of the consecutive frames to attain power supply to a plurality of external devices.

Figure 6:
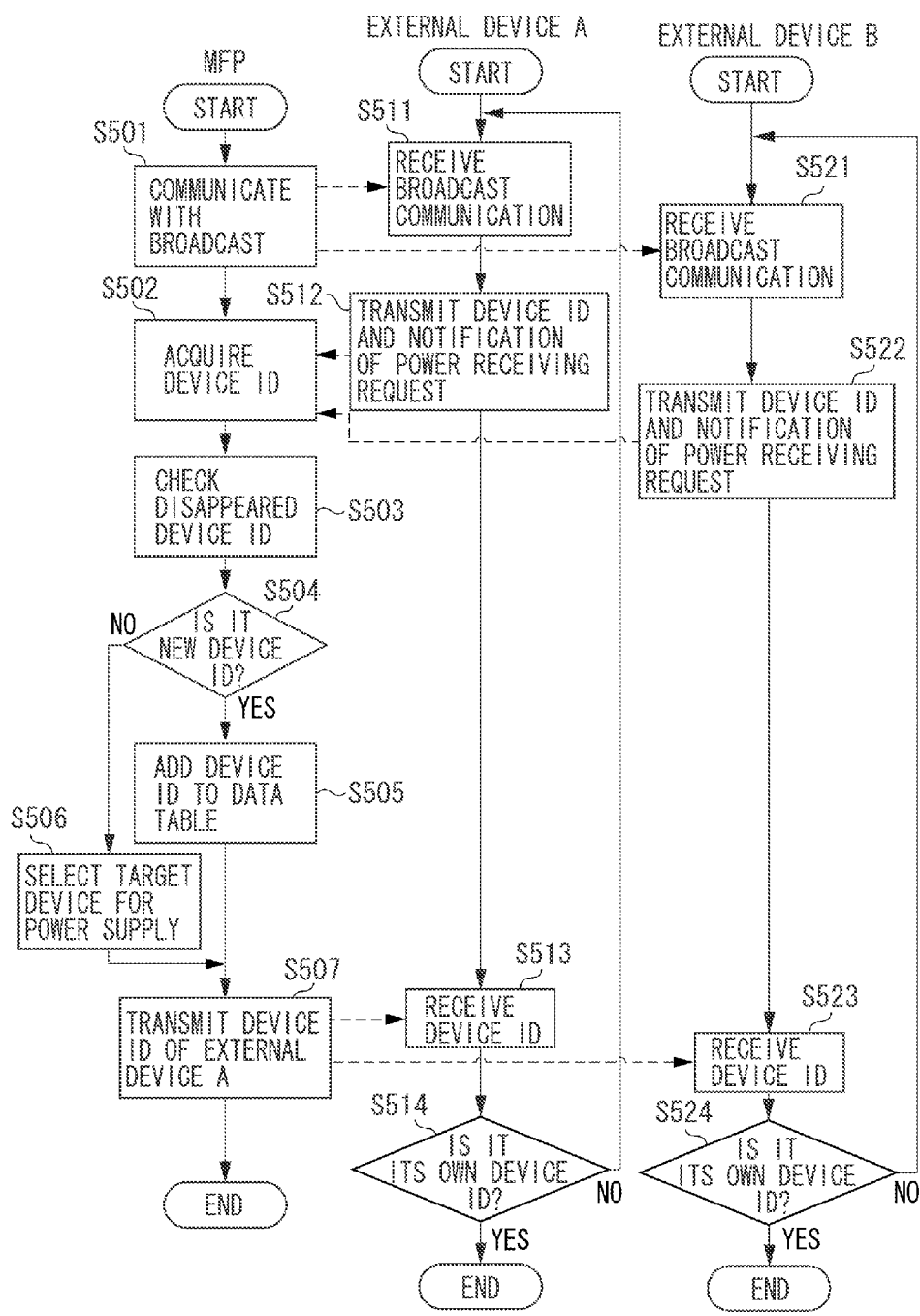
FIG. 6 is a diagram illustrating processing in an association period.

FIG. 6 is a sequence diagram illustrating processing carried out in the association period in detail. Processing performed by the MFP 101 and external devices A and B will be described with reference to FIG. 6. Here, the number of external devices with which the MFP 101 communicates is not limited to that described in the present exemplary embodiment. First, when the processing in the association period is performed, in step S501, the CPU 214 of the MFP 101 causes the power supply communication unit 222 to notify the external device of the start of power supply via broadcast communication.

In steps S511 and S521, the external devices A and B receive information indicating the start of power supply from the MFP 101 via the broadcast communication, respectively. If the external devices A and B desire the reception of power, the processing proceeds to steps S512 and S522, respectively. In steps S512 and S522, the external devices A and B transmit notifications of power receiving request together with their own device IDs to the MFP 101, respectively.

In step S502, the CPU 214 of the MFP 101 causes the power supply communication unit 222 to receive the device ID from an external device requesting power supply. If there is a plurality of external devices requesting power supply, the CPU 214 sequentially receives the device IDs of the respective external devices (reception processing). Subsequently, when receiving a device ID, the CPU 214 identifies a source external device transmitting the device ID as an external device allowed to receive power from the MFP 101 (power receptive device identification processing). Here, the received device ID identifies the source external device.

In step S503, the CPU 214 makes a comparison between the received device ID (the device ID of the external device allowed to receive power from the MFP 101) and the device IDs stored in the data table. Then, if there is a device ID not acquired in step S502 among the device IDs stored in the data table, the CPU 214 deletes any record corresponding to the unacquired device ID from the data table.

In step S504, the CPU 214 refers to the data table and then determines whether the data table includes the device ID acquired in step S502. If the data table does not include the acquired device ID, that is, such a device ID is the device ID of a new external device, the CPU 214 performs processing in step S505. If the data table includes the acquired device ID, that is, such a device ID is the device ID of the external device already supplied with power in the frame already subjected to the power supply processing, the CPU 214 performs processing in step S506.

In Step S505, the CPU 214 creates a record of a new device ID and adds the record to the data table. Thus, in this step in the power supply processing, the CPU 214 appropriately adds the information of the external device (power receptive device) to the data table as a new record, thereby updating the record.

In step S505, the CPU 214 selects a device with a new device ID as a target device for power supply. In this way, when the CPU 214 detects a new external device, the CPU 214 preferentially selects the new external device as a target device for power supply.

In step S506, the CPU 214 selects the device ID of the external device to which power is supplied in the current frame, in other words, the device ID of the target device for power supply among the received device IDs. During processing for selecting the target device for power supply, the CPU 214 refers to the power supply ability of the MFP 101 and the required power of each external device stored in the data table. More specifically, the CPU 214 allocates processing time and a frame ID to each frame. Then, the CPU 214 sequentially selects target devices for power supply by selecting the frame IDs.

In the processing for selecting a target device for power supply, for example, the CPU 214 selects a target device for power supply with reference to the order of entries or in the order of registrations which are preregistered when the wireless power supply unit 224 has sufficient power supply ability. If the priority is predetermined, the CPU 214 may select the target devices for power supply in the order of precedence.

In step S507, the CPU 214 causes the power supply communication unit 222 to transmit the device ID of the target device for power supply to the authenticated external device to notify the user of authentication of power supply. Here, the CPU 214 preferentially authenticates a new external device. Consequently, the MFP 101 completes its processing in the association period. Subsequently, the MFP 101 performs the processing in the transfer preparation period.

In steps S513 and S523, on the other hand, the external devices A and B receive device IDs and perform the processing in steps S514 and S524, respectively. In steps S514 and S524, the external devices A and B determine whether the received device IDs are their own device IDs, respectively.

If the device IDs are their own device IDs, the external devices A and B terminate the processing in the association period, followed by performing the processing in the transfer preparation period. If the device IDs are not their own device IDs, the processing of the external devices A and B returns to step S511 and S521, respectively. Subsequently, the external devices A and B wait for the broadcast communication in the association period of the next frame.

In step S506, for example, if the MFP 101 selects the external device A, then the external device A completes the processing in the association period. Subsequently, the external device A performs the processing in the transfer preparation period. At this time, the external device B returns to the processing in step S521, followed by waiting for the broadcast communication in the association period of the next frame.

Figure 7:
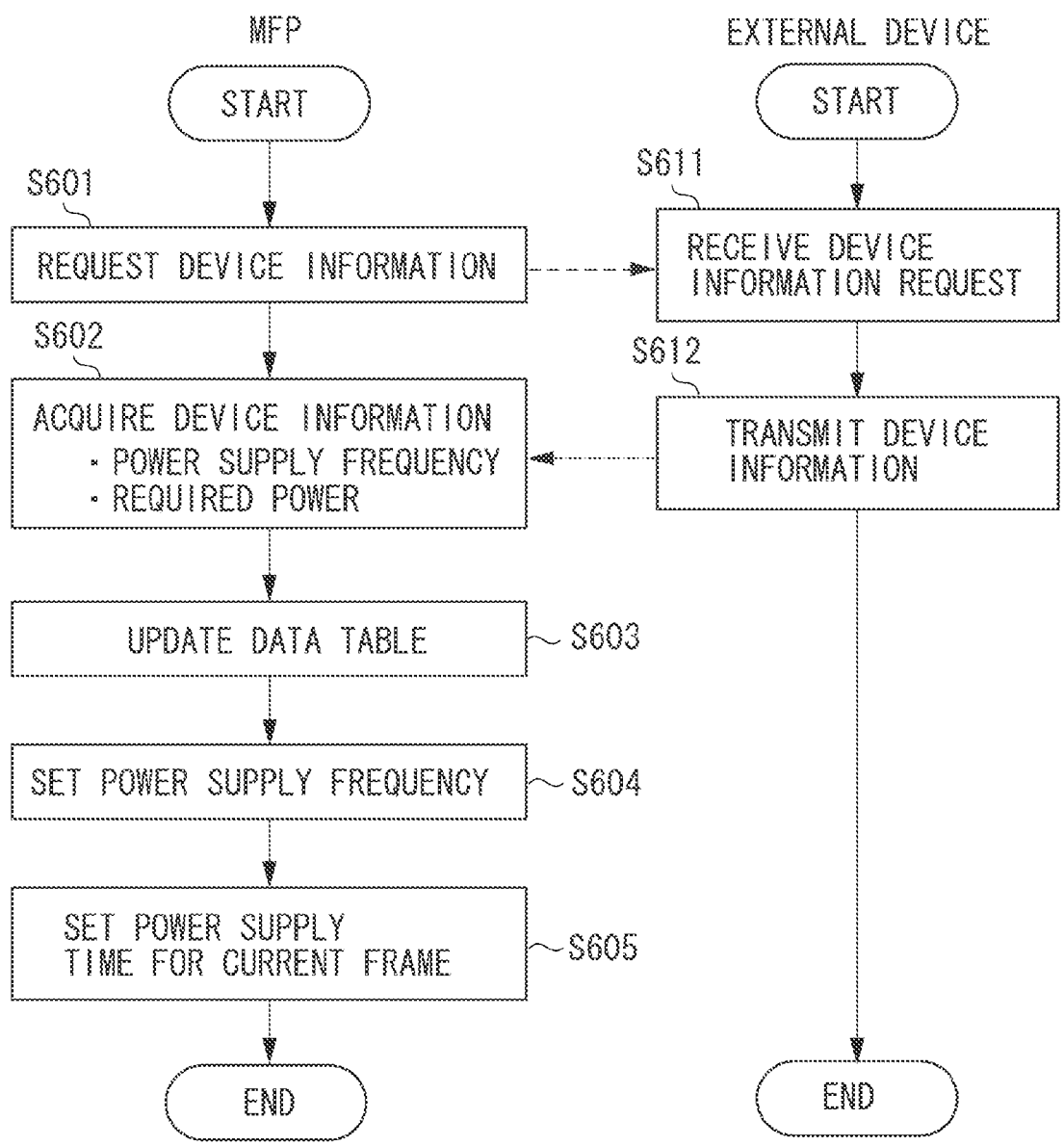
FIG. 7 is a diagram illustrating processing in a transfer preparation period.

FIG. 7 is a sequence diagram illustrating the processing in the transfer preparation period in detail. The processing in the transfer preparation period will be described with reference to FIG. 7 using the processing performed when the external device A is selected in the association period as an example. First, in step S601, the CPU 214 of the MFP 101 causes the power supply communication unit 222 to transmit a request for the device information together with the device ID of the external device to be authenticated and supplied with power. The device information includes frequency information for performing power supply, required power to be supplied to the external device A, and the like.

In step S611, the external device A receives a request for the device information together with its own device ID. In step S612, the external device A transmits the requested device information, thereby completing the processing in the transfer preparation period.

On the other hand, in step S602, the CPU 214 of the MFP 101 acquires the required information, that is, the device information, from the external device to which power is supplied.

Next, in step S603, the CPU 214 associates the acquired device information with the device ID, followed by adding the device information to the data table. In other words, the CPU 214 updates the data table.

In step S604, the CPU 214 refers to the data table and sets a power supply frequency to the wireless power supply unit 224. In step S605, the CPU 214 refers to the data table, calculates power supply time in the current frame, and sets the power supply time to the wireless power supply unit 224. Consequently, the MFP 101 completes its processing in the transfer preparation period. Processing for calculating power supply time will be described below.

FIG. 8 is a sequence diagram illustrating processing carried out in the power transfer period in detail. The processing in the power transfer period will be described with reference to FIG. 8 using the processing performed when the external device A is selected in the association period as an example. In step S701, the CPU 214 of the MFP 101 sets a power supply start command to the wireless power supply unit 224. Then, the MFP 101 starts power supply (power supply processing). In contrast, in step 711, the external device A detects the start of power supply from the MFP 101.

Subsequently, in step S712, the external device A determines whether the power supply interruption to be requested to the MFP 101. For instance, if predetermined conditions are satisfied, the external device A requests an interruption of power supply. Here, in the external device A, conditions for coping with an unanticipated situation are predefined.

If the external device A does not request an interruption of power supply (NO in step S712), the external device A proceeds to the processing in step 714, followed by repeating the processing in steps S712 to S714 until the external device A receives a notification of power supply completion. If the external device A requests an interruption of power supply (YES in step S712), the external device A proceeds to the processing in step S713. In other words, in step S713, the external device A transmits an interruption request to the MFP 101. Subsequently, the external device A proceeds to the processing in step S714.

In step S702, an interrupt signal from the wireless power supply unit 224 allows the CPU 214 of the MFP 101 to detect the completion of the power supply time. If the CUP 214 detects the completion (YES in step S702), the CPU 214 proceeds to the processing in step S703. If the CPU 214 does not detect the completion (NO in step S702), the CPU 214 proceeds to the processing in step S704.

In step S704, the CPU 214 determines whether the CPU 214 receives an interruption request for power supply from the external device A via communication with the supply communication unit 222. If the CPU 214 receives an interruption request (YES in step S704), the CPU 214 performs processing in step S705. If the CPU 214 does not receive the interruption request (NO in step S704), the CPU 214 proceeds to the processing in step S702, and performs the processing until the power supply is terminated.

In step S705, the CPU 214 sets a power supply stop command to the wireless power supply unit 224 based on the interruption request for power supply. Thus, the CPU 214 terminates power supply from the wireless power supply unit 224.

When completing or terminating the power supply (YES in step S702), in step S703, the CPU 214 of the MFP 101 issues a notification of power supply completion to the external device via the power supply communication unit 222 to request the device information such as the status of the external device A. Here, the status is information that represents whether the external device A locates within the boundary of the power suppliable area 106, and is the information corresponds to the area of the data table (FIG. 3).

In step S713, the external device A transmits an interruption request and then in step S714, receives a notification of power supply completion from the MFP 101, followed by proceeding to the processing in step S715. In this way, the MFP 101 can appropriately terminate the power supply in response to the request from the external device A. Next, in step S715, the external device A transmits the device information of the external device A requested from the MFP 101, such as information about the status and the battery charging status of the external device A, to the MFP 101.

In step S706, the CPU 214 of the MFP 101 receives the device information of the external device A via the power supply communication unit 222. In step S707, the CPU 214 updates the data table based on the received device information. In other words, the CPU 214 writes the area and the battery charging status, which correspond to the device ID of the external device A, in the data table.

Here, the external device A determines the status corresponding to the area of the data table. For example, when the external device A locates in a position far from the MFP 101, the efficiency of wireless power supply may become inefficient and the ability of power supply from the MFP 101 to the external device A may become less than the required power. In this case, therefore, the external device A replies status "OUT" to the MFP 101 in step S706. On the other hand, when the MFP 101 performs power supply according to the required power of the external device A without any trouble, the external device A replies status "IN" to the MFP 101.

In step S708, the CPU 214 transmits a reception notification of the device information to the external device A. Consequently, the MFP 101 completes its processing in the power transfer period. Furthermore, in step S716, the external device A receives device information from the MFP 101 and completes the processing in the power transfer period.

Next, description will be made on the processing in step S605 in the transfer preparation period, where the CPU 214 refers to the data table to calculate the power supply time of the external device serving as a power supply target. Specifically, description will be made on allocation processing in which the power supply ability of the wireless power supply unit 224 is set to 1,000 mW/min, for example.

For example, description will be made on a case where the data table includes three external devices of device IDs 03, 02, and 05. In this case, the CPU 214 respectively allocates these device IDs to frames with reference to the data table (FIG. 3) as follows:

Frame 1: device ID 03, 100 mW/min, 20-second power supply;

Frame 2: device ID 02, 200 mW/min, 20-second power supply; and

Frame 3: device ID 05, 200 mW/min, 20-second power supply.

In this case, the total amount of power supplied to three external devices is 500 mW/min calculated from Equation 1.

$$100+200+200=500 \text{ (mW/min)} \qquad \text{(Equation 1)}$$

The total amount of power (500 mW/min) is less than the power supply ability (1,000 mW/min) of the wireless power supply unit 224.

Figure 9:
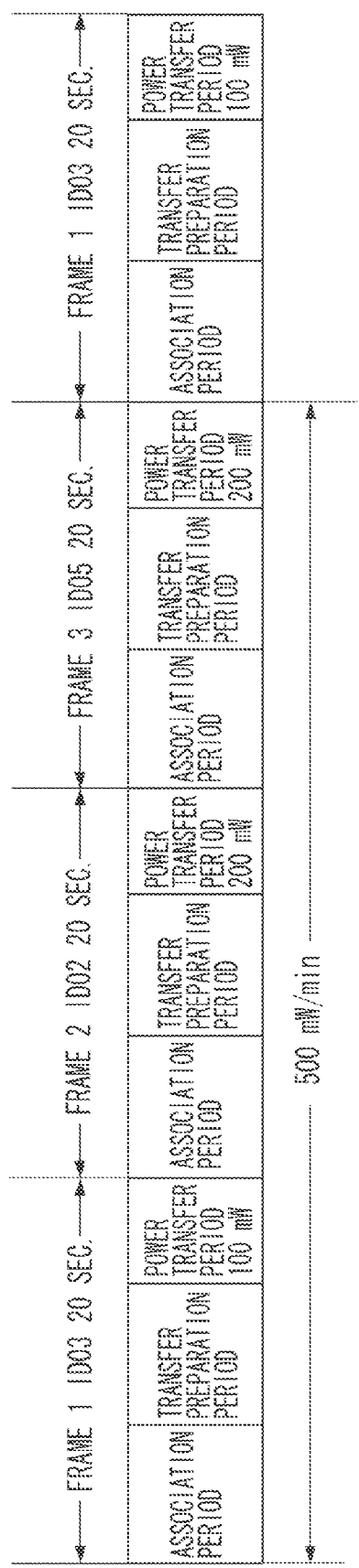
FIG. 9 is a diagram illustrating an example of a resulting frame allocation.

Thus, the CPU 214 allocates the device IDs to the respective frames as described above, and then sets the power supply time of the device IDs 03, 02, and 05. Then, the CPU 214 performs processing on the frames in the order of frame 1, frame 2, frame 3, and frame 1 in a repetitive manner to supply power to the external devices. FIG. 9 is a schematic diagram illustrating the results of the above frame allocation. As illustrated in FIG. 9, the CPU 214 continuously performs the respective frame processing.

Furthermore, the above frame processing takes 20 seconds including the association period, transfer preparation period, and power transfer period. However, the power transfer period per frame occupies 90% or more of one frame. Thus, as an alternative example, the CPU 214 may calculate the power supply time of the respective periods such that the power transfer period takes 20 seconds.

Furthermore, description will be made on a case where the data table includes three external devices of device IDs 03, 02, and 04. In this case, the CPU 214 respectively allocates these device IDs to frames as follows:

Frame 1: device ID 03, 100 mW/min, 20-second power supply;

Frame 2: device ID 02, 200 mW/min, 20-second power supply; and

Frame 3: device ID 04, 800 mW/min, 20-second power supply.

In this case, the total amount of power supplied to three external devices is 1,100 mW/min calculated from Equation 2.

$$100+200+800=1,100 \text{ (mW/min)} \quad \text{(Equation 2)}$$

The total amount of power (1,100 mW/min) is more than the power supply ability (1,000 mW/min) of the wireless power supply unit 224. Thus, one of the external devices should be out of the power supply targets. For example, the CPU 214 may select the device ID 03 as one out of the power supply targets. In this case, the CPU 214 allocates the remaining external device IDs to the respective frames and sets their power supply time as follows:

Frame 1: device ID 02, 200 mW/min, 30-second power supply; and

Frame 2: device ID 04, 800 mW/min, 30-second power supply.

If the user desires to target the external device of device ID 03, the user can set the power supply ability of the wireless power supply unit 224 to as high as 1,100 mW/min via the operation unit 211. Thus, the external device of device ID 03 can be included in the power supply targets.

Furthermore, the user can set the power supply ability of the wireless power supply unit 224 to as low as 300 mW/min. Thus, the CPU 214 can prevent the wireless power supply unit 224 from supplying an excessive amount of power, thereby reducing power consumption.

In this case, the CPU 214 selects the external device of device ID 04 as one out of the power supply targets, and the CPU 214 respectively allocates the device IDs to frames and sets their power supply time as follows:

Frame 1: device ID 03, 100 mW/min, 30-second power supply; and

Frame 2: device ID 02, 200 mW/min, 30-second power supply.

In this case, the total amount of power supplied to two external devices is 300 mW/min calculated from Equation 3.

$$100+200=300 \text{ (mW/min)} \quad \text{(Equation 3)}$$

In the above processing, when the external device out of the power supply targets is selected, the CPU 214 sets a Stop flag to the power supply flag corresponding to the selected external device in the data table.

Alternatively, the user may select the external device out of the power supply targets via the operation unit 211 to set power supply. In this case, the CPU 214 keeps the setting of the power supply ability of the wireless power supply unit 224 to 1,000 mW/m, while adjusting the frame allocation, for example, as follows:

Frame 1: device ID 03, 100 mW/min, 30-second power supply;

Frame 2: device ID 04, 800 mW/min, 30-second power supply;

Frame 3: device ID 02, 200 mW/min, 30-second power supply; and

Frame 4: device ID 04, 800 mW/min, 30-second power supply.

In other words, the CPU 214 sets the power supply of 2,000 mW per two minutes, and adjusts the frame allocation to prevent the power supply ability of the wireless power supply unit 224 from exceeding 1,000 mW/min.

Thus, the CPU 214 performs processing to always provide the data table with the most up-to-date data, while performing the frame allocation with reference to the data table.

Figure 10:
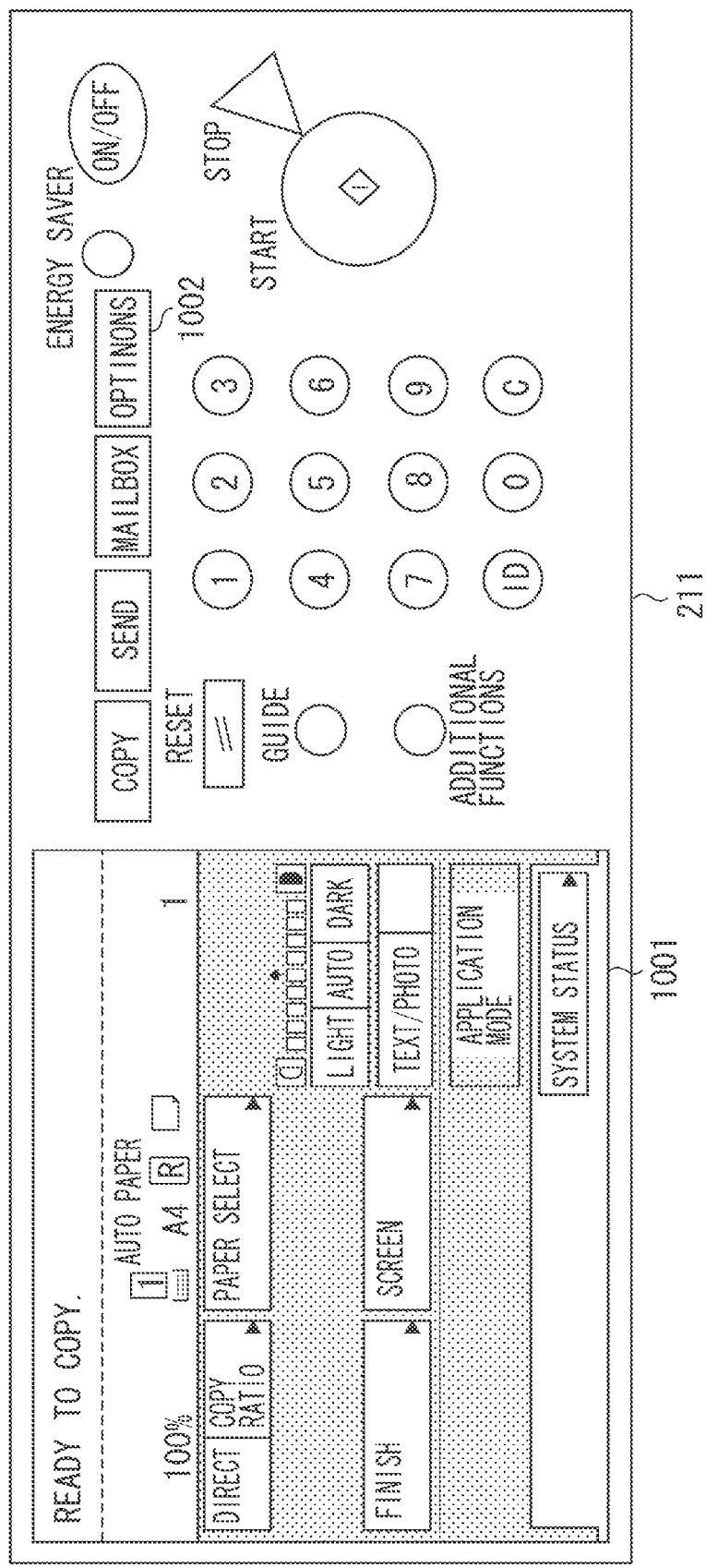
FIG. 10 is a diagram illustrating an operation unit.

Furthermore, the CPU 214 performs processing with reference to the data table to display on the operation unit 211 the information about power supply to each external device. FIG. 10 is a diagram illustrating the operation unit 211. The operation unit 211 includes an operation screen 1001 and an options button 1002. The operation screen 1001 is a liquid-crystal operation touch panel. For example, the user can operate the options button 1002 to change the operation screen 1001. Thus, the user can perform various kinds of setting on the operation screen 1001.

For example, when the user operates the options button 1002 to change the operation screen 1001, the operation screen 1001 displays a display-setting button for power supply information (not illustrated). The display-setting button for power supply information is a button that allows the MFP 101 to receive the user's instruction for displaying the power supply information.

Description will be made below on processing for displaying the power supply information, by which the operation unit 211 displays the information about power supply to each external device. The user selects the display-setting button for power supply information from the operation unit 211 to cause the operation control unit 209 to transmit a request for displaying the power supply information to the CPU 214 via the bus 212.

The CPU 214 reads out information required for displaying the information from the data table, and then prepares display data as illustrated in FIG. 11. The display data includes device IDs registered in the data table. The display data further includes battery charging status, power supply status, a power supply area, a priority flag, and a cooperation flag, corresponding to each device ID.

As described above, the battery charging status is represented by a unit of percent (%). The power supply status corresponds to the power supply flag of the data table. "Supply" is displayed indicating that power is being supplied, and "Stop" is displayed indicating that power is not being supplied, as the power supply information.

The power supply area corresponds to the area of the data table. "IN" is displayed on a power supply area corresponding to the external device located inside the power suppliable area 106. "OUT" is displayed on a power supply area corresponding to the external device located outside the boundary of the power suppliable area 106.

The priority flag corresponds to the priority flag of the data table. When the user sets an external device as one to which power is supplied preferentially, the priory flag of this external device indicates "Priority".

The cooperation flag corresponds to the cooperation flag of the data table. The cooperation flag indicates a state where the external device cooperates with the MFP 101. For example, "Print" is displayed when the external device is performing a print job, and "Scan" is displayed when the external device is performing a scan job.

The CPU 214 transfers the prepared display data to the operation control unit 209 via the bus 212, and then issues a display command. The operation control unit 209 displays the display data on the operation screen 1001 of the operation unit 211 in response to the display command.

Figure 12:
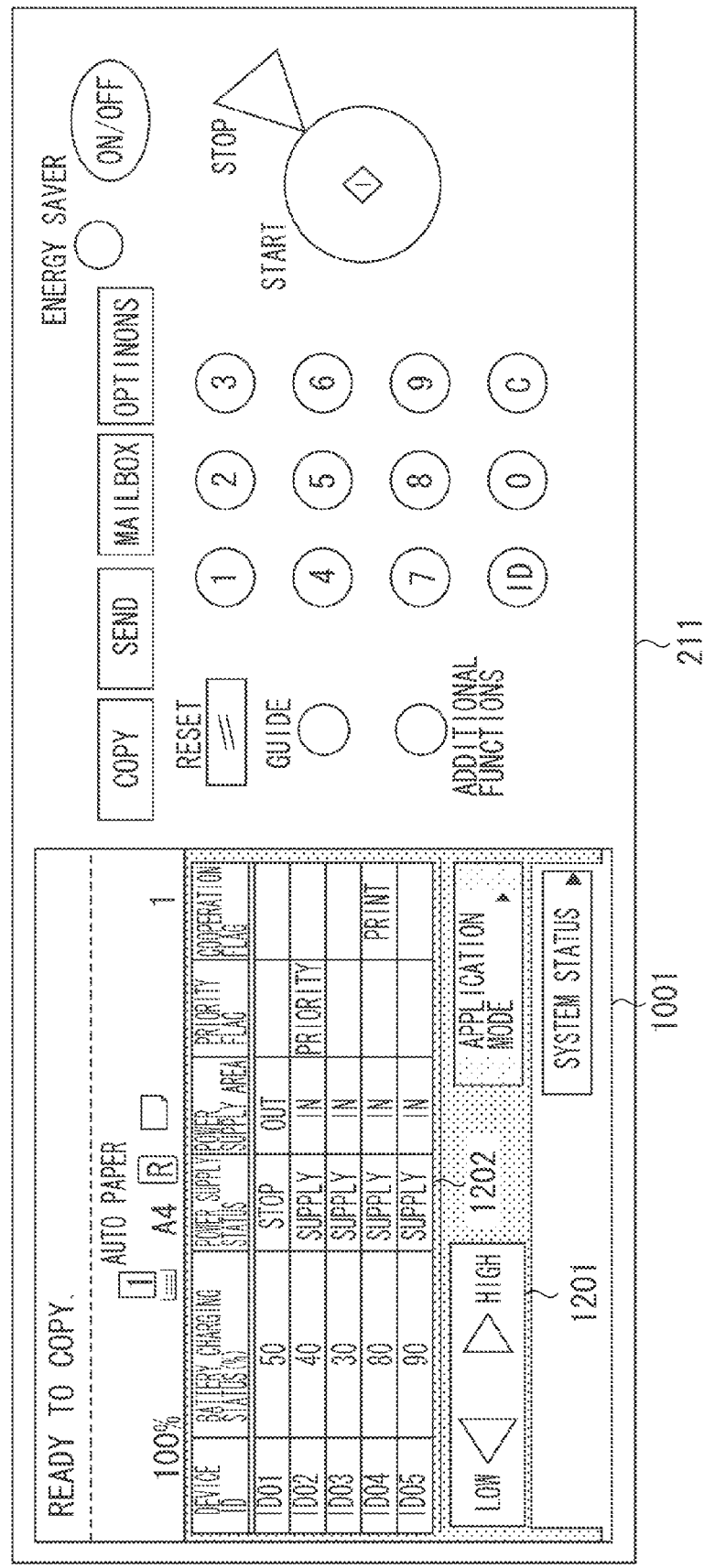
FIG. 12 is a diagram illustrating a display example of a display data screen.

FIG. 12 is a diagram illustrating an example of a display data screen displayed on the operation screen 1001. A display data screen 1202 illustrated in FIG. 12 corresponds to the display data illustrated in FIG. 11. The operation unit 211 displays the display data of FIG. 11 as illustrated in FIG. 12.

The display data screen 1202 displays the states of the external device of device ID 01 such that the battery charging status is 50%, the power supply is in a "Stop" state, the external device is out of the power suppliable area 106, and neither the priority flag nor the cooperation flag are present.

Furthermore, the display data screen 1202 displays the states of the external device of device ID 02 such that the battery charging status is 40%, the external device is located within the power suppliable area 106, the power supply is in a "Supply" state, the priority flag is set, and the cooperation flag is not present.

Furthermore, the display data screen 1202 displays the states of the external device of device ID 04 such that the battery charging status is 80%, the external device is located within the power suppliable area 106, the power supply is in a "Supply" state, the priority flag is not present. Furthermore, display data screen 1202 displays the state of the external device of device ID 04 as the cooperation flag "Print", thereby representing that this external device is in a state of being cooperated with the MFP 101.

The user operates the operation screen 1001 of touch panel type to select a desired device ID and make various kinds of settings such as a priority flag setting. In addition, the user may operate the operation screen 1001 to make settings of the start of power supply, the stop of power supply, and the like for the external device located within the power suppliable area 106. When the user changes the settings via the operation screen 1001, a change instruction is transmitted to the CPU 214 via the operation control unit 209 and the bus 212. Then, the CPU 214 controls the settings.

Furthermore, when the state of the external device satisfies conditions for changing the power supply ability, the CPU 214 displays on the operation screen 1001 the display data screen 1202 together with a power-supply ability changing key 1201. Here, the power-supply ability changing key 1201 is a user interface that receives an instruction for changing the boundary of the power suppliable area 106, that is, the power supply ability of the wireless power supply unit 224. The conditions for changing the power supply ability will be described below.

Description will be made below on processing for optimizing the boundary of the power suppliable area 106 by changing the power supply ability of the wireless power supply unit 224. The power supply ability of the wireless power supply unit 224 is set to a default value at the beginning. In addition, the operation unit 211 cannot receive the user's instruction for changing the power supply ability at this time. Thus, the operation unit 211 does not handle any processing for changing the power supply ability of the wireless power supply unit 224 in response to the change instruction from the user.

As described above, however, if the state of the external device satisfies conditions for changing the power supply ability, the operation unit 211 is able to receive the user's instruction for changing the power supply ability. Thus, the MFP 101 of the present exemplary embodiment can change the power supply ability in response to the user's change instruction.

Here, the conditions for changing the power supply ability are conditions of the external device. The CPU 214 determines whether the state of the external device satisfies the conditions for changing the power supply ability based on the information received by the MFP 101 from the external device in the power supply processing. More specifically, the MFP 101 predefines the following five conditions:

Condition 1: all devices are capable of only communication;

Condition 2: a device out of the power supply area is in cooperation with the MFP;

Condition 3: the number of the devices in the power supply area is larger than that of devices to which power can be supplied;

Condition 4: only one device to which power can be supplied is included in the power supply area; and Condition 5: a device requires preferential power supply.

An example will be described below such that the number of the devices to which power can be supplied in Condition 2 above is five according to the present exemplary embodiment.

The CPU 214 determines whether the state of the external device satisfies any of the above conditions based on the information received from the external device in the power supply processing. If the state satisfies any of these conditions, the CPU 214 displays the power-supply ability changing key 1201. If the state does not satisfy any condition, the CPU 214 does not display the power-supply ability changing key 1201.

Figure 14:
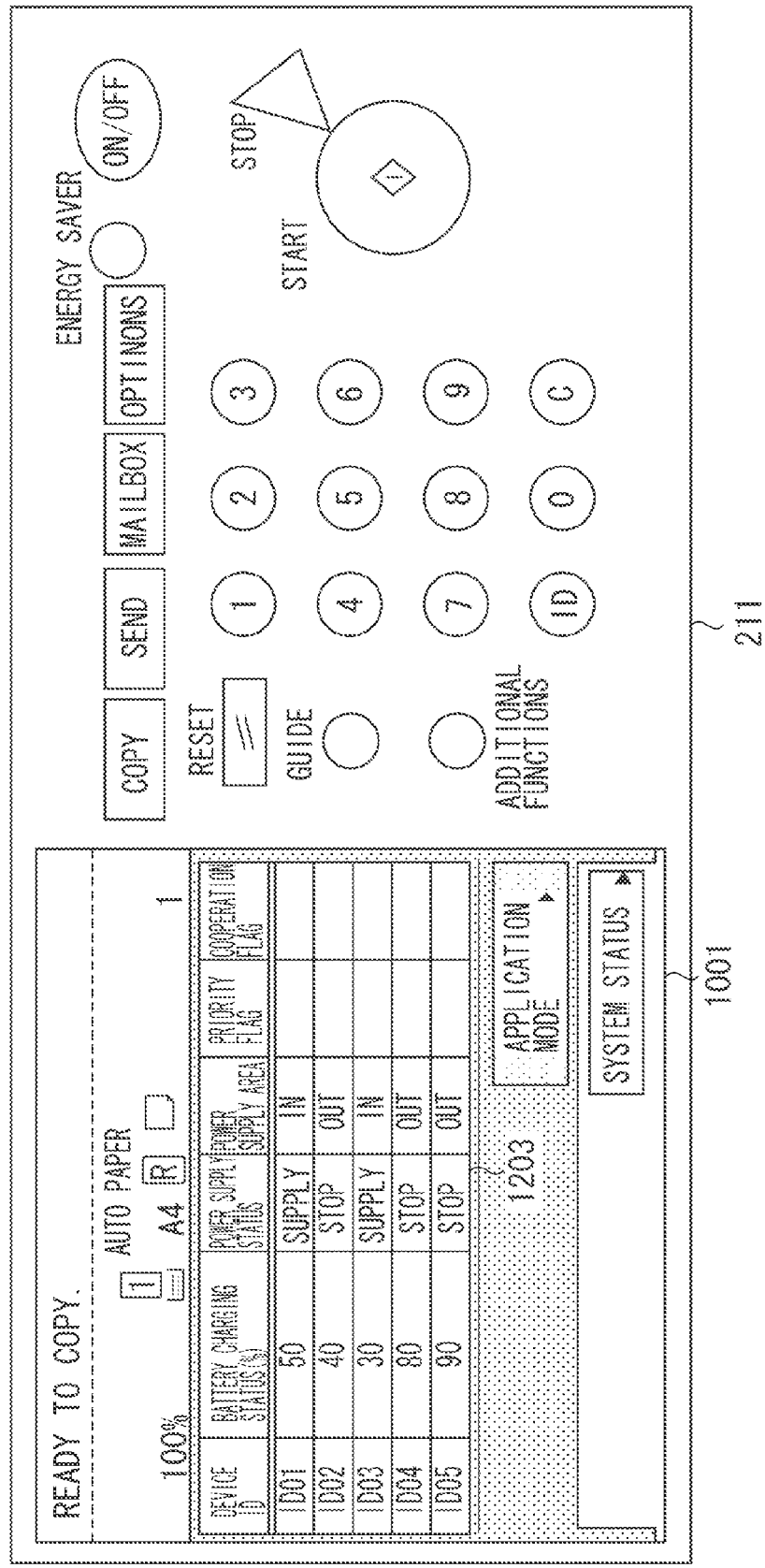
FIG. 14 is a diagram illustrating a display example of a display data screen.

First, description will be made on the case in which the state of the external device does not satisfy the conditions for changing the power supply ability. For example, based on the data table, the CPU 214 prepares display data as illustrated in FIG. 13. In this case, the CPU 214 refers to the data table and determines that the state of the external device does not satisfy the conditions for changing the power supply ability. Thus, as illustrated in FIG. 14, the operation screen 1001 displays only a display data screen 1203 corresponding to the display data in FIG. 13, and does not display the power-supply ability changing key 1201.

Figure 16:
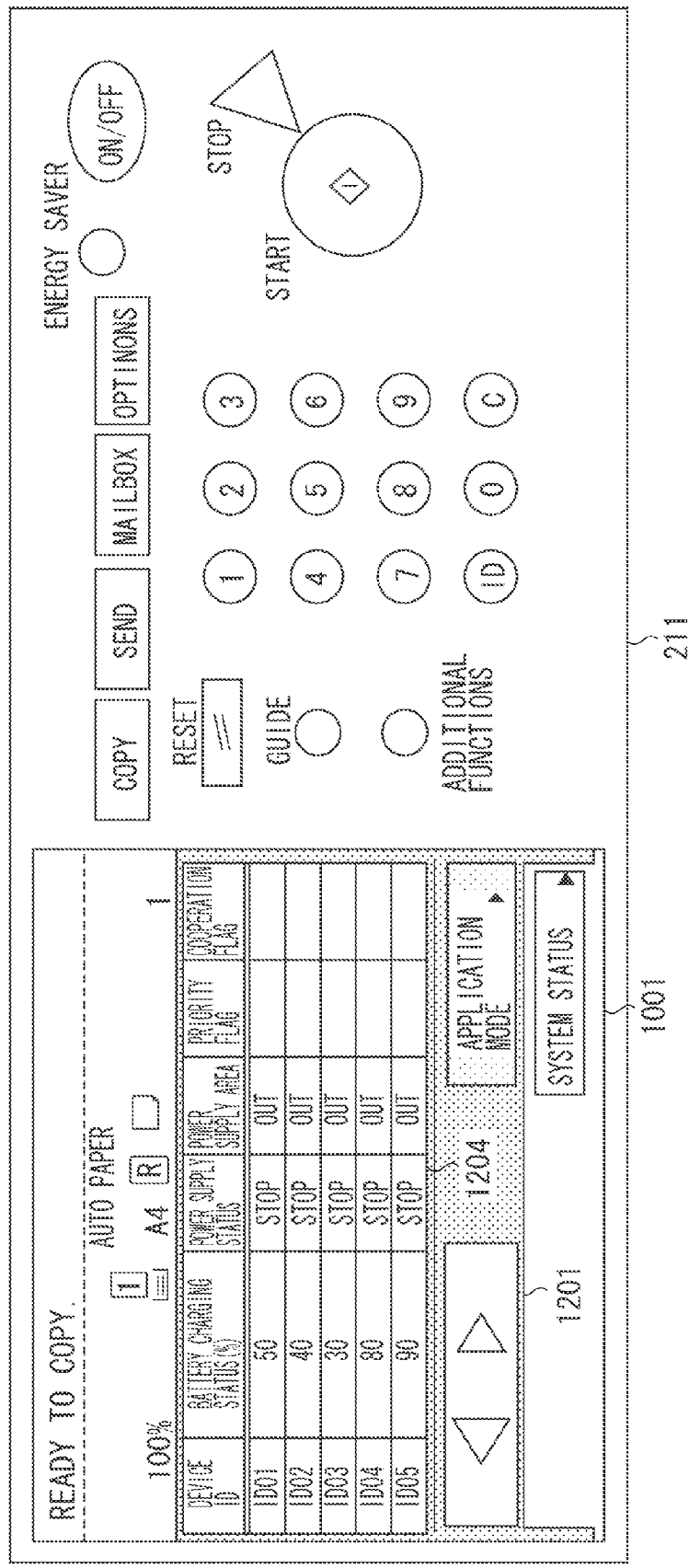
FIG. 16 is a diagram illustrating a display example of a display data screen.

Next, description will be made on the case in which the state of the external device satisfies the conditions for changing the power supply ability. For example, based on the data table, the CPU 214 prepares display data as illustrated in FIG. 15. In this case, the CPU 214 refers to the data table and determines that the state of the external device satisfies Condition 1. Thus, as illustrated in FIG. 16, the operation screen 1001 displays a display data screen 1204 corresponding to the display data in FIG. 15. The operation screen 1001 also displays the power-supply ability changing key 1201. The user operates the power-supply ability changing key 1201 to change the power supply ability of the wireless power supply unit 224, thereby changing the boundary of the power suppliable area 106. In the example illustrated in FIG. 15, for example, the state of the external device satisfies Condition 1.

Thus, the power suppliable area 106 can be extended by increasing the power supply ability of the wireless power supply unit 224. Thus, the MFP 101 becomes possible to supply power to an external device located in a position far from the MFP 101. Furthermore, the power supply ability changed by the power-supply ability changing key 1201 can be changed to a default value when the external device serving as a power supply target moves out of the changed power suppliable area 106.

Figure 17:
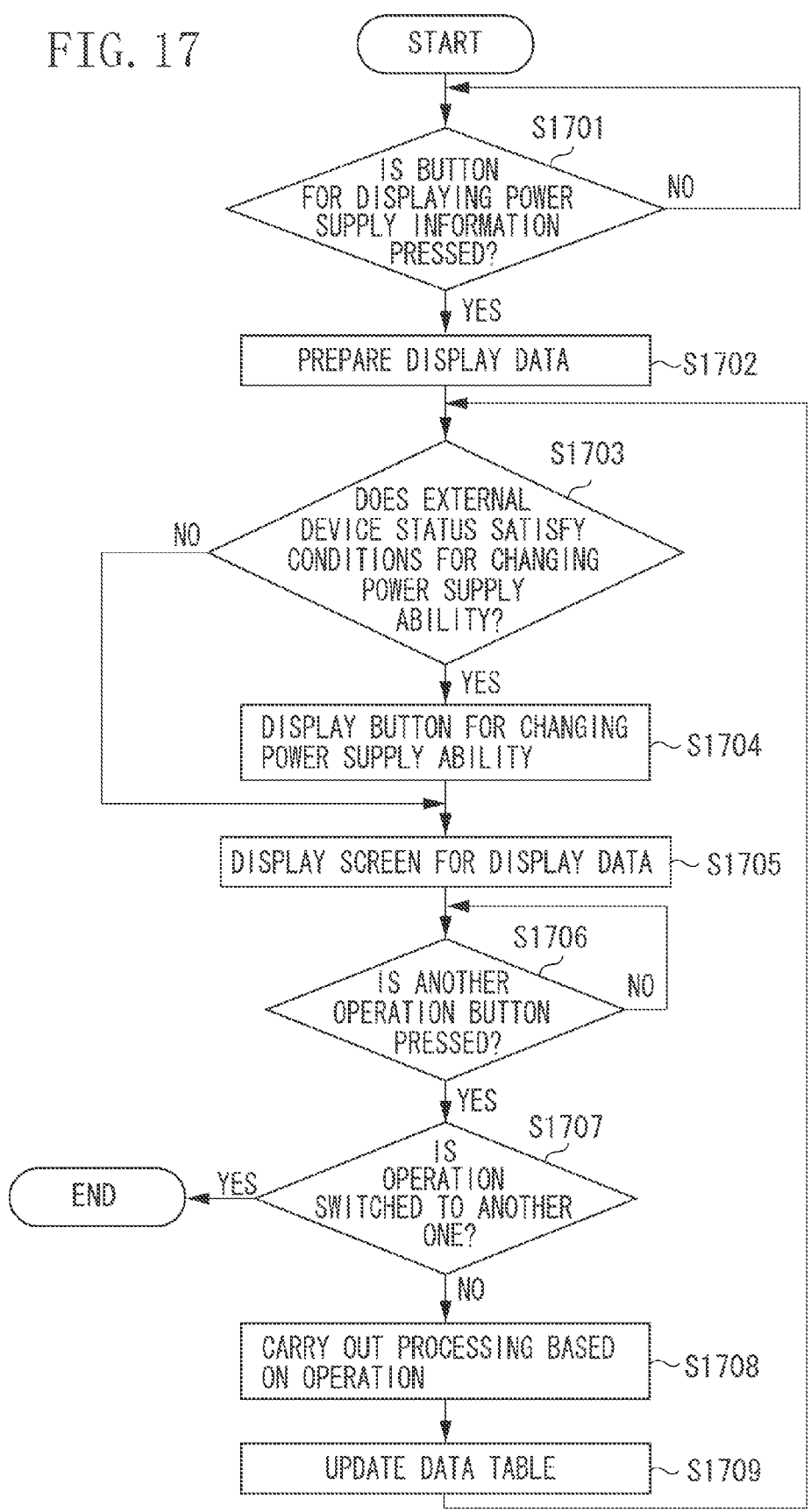
FIG. 17 is a diagram illustrating display processing.

FIG. 17 is a flow chart illustrating display processing for displaying the display data screen. In step S1701, the CPU 214 determines whether the user selects a display button for power supply information from the operation unit 211. If the user selects the display button for power supply information (YES in step S1701), the CPU 214 starts processing for generating a display data screen, and then proceeds to processing in step S1702.

In step S1702, the CPU 214 prepares display data based on the data table. Next, in step S1703, the CPU 214 determines whether the state of the external device satisfies the conditions for changing the power supply ability. If the state satisfies the conditions for changing the power supply ability (YES in step S1703), the CPU 214 proceeds to processing in step S1704. If the state does not satisfy the conditions for changing the power supply ability (NO in step S1703), the CPU 214 proceeds to step S1705.

In step S1704, the CPU 214 displays a button for changing power supply ability on the operation screen 1001. Next, in step S1705, the CPU 214 displays the display data screen prepared in step S1702 on the operation screen 1001. Here, the display data screen displays an external device allowed to receive power from the MFP 101.

In other words, step S1705 represents an example of display control processing. The display screen, which displays the button for changing power supply ability in step S1704, and displays the display data screen in step S1705, is an example of the changing screen.

In step S1706, the CPU 214 determines whether the user operates another operation button in the operation unit 211. If the CPU 214 determines that the user operates another operation button (YES in step S1706), the CPU 214 proceeds to processing in step S1707. In step S1707, if the CPU 214 determines that the user performs another operation other than predetermined operations (YES in step S1707), the CPU 214 completes the display processing.

In step S1707, the CPU 214 determines that the user performs a predetermined operation (NO in step S1707), the processing proceeds to step S1708. In step S1708, the CPU 214 executes processing corresponding to the selected operation button. The processing corresponding to the operation button includes setting or canceling the priority flag for the desired external device, and the start and stop of power supply to the desired external device. Furthermore, when the operation screen 1001 displays the button for changing power supply ability, processing corresponding to the operation button includes processing for changing the power supply ability.

For example, the user selects and inputs a desired external device, and then inputs an instruction for starting power supply to the selected external device. In this case, in step S1708, the CPU 214 receives the input for selecting the external device as a power supply target (input reception processing). Then, the CPU 214 identifies the external device selected by the user as a power supply target (target device for power supply) (processing for identifying a target device for power supply).

Furthermore, for example, the user performs an input for selecting a desired external device, and inputs an instruction for terminating power supply to the selected external device. In this case, in step S1708, the CPU 214 receives the input for selecting the external device as a power supply target. Then, the CPU 214 deletes the selected external device from the external device as a power supply target (target device for power supply) (processing for identifying a target device for power supply).

Furthermore, for example, in a state of displaying the button for changing power supply ability, the user operates the button for changing power supply ability to specify the value of power supply ability after being changed. In this case, in step S1708, the CPU 214 receives the value of power supply ability after the change input from the user, and changes the power supply ability of the wireless power supply unit 224 to the power supply ability after the change input from the user (processing for changing the amount of power). Here, the power supply ability of the wireless power supply unit 224 is a value of the amount of power at the time of power supply. The processing in step S1707 is an example of the input reception processing, and the processing in step S1708 is an example of the processing for changing the amount of power.

Subsequently, in step S1709, the CPU 214 updates the data table based on the results of the executed processing, followed by proceeding to step S1703.

As described above, the MFP 101 of the present exemplary embodiment displays a display data screen to receive the user's selection of an external device requesting power supply and identify the external device as a power supply target based on the user's selection. Furthermore, the MFP 101 receives an instruction for changing the power supply ability and changes the power supply ability based on the change instruction. Therefore, the MFP 101 can perform power supply upon the user's request. Furthermore, the MFP 101 can be prevented from performing power supply not intended by the user and consuming unnecessary power due to inefficient power supply.

The MFP 101 of the present exemplary embodiment displays on the operation screen 1001 a display data screen indicating a power receptive device, and allows the user to select a target device for power supply on the display data screen. However, the MFP 101 may not display the power receptive device on the operation screen 1001. For example, in some cases, the user desires the power supply to the external device while in other cases, the user does not desire the power supply to the external device. In this case, via the operation unit 211, the user may input an instruction for starting or stopping the power supply to the external device provided as a desired target without reference to the display data screen. In this case, the CPU 214 may identify the target device for power supply based on the input to the operation unit 211.

Furthermore, as another example, when the state of the external device satisfies the conditions for changing the power supply ability, the CPU 214 may automatically change the power supply ability without receiving an instruction from the user. For example, when the state of the external device satisfies Condition 1, the CPU 214 may increase the amount of power to a predetermined level.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-003525 filed Jan. 11, 2013, which is hereby incorporated by reference herein in its entirety.

What is claimed is:

1. A power supply apparatus comprising:
a wireless power supply unit configured to wirelessly supply power to a device located within a power supply area;
an acquiring unit configured to acquire device information from a device located within a communication area; and
a display unit configured to display, based on the device information acquired by the acquiring unit, a status screen indicating a status of the device located within the communication area,
wherein a changing object for changing the power supply area is displayed on the status screen.

2. The power supply apparatus according to claim 1, further comprising:
a determining unit configured to determine whether to display the changing object on the status screen,
wherein if the determining unit determines to display the changing object on the status screen, the display unit displays the changing object on the status screen, and if the determining unit determines not to display the changing object on the status screen, the display unit does not display the changing object on the status screen.

3. The power supply apparatus according to claim 1, wherein the wireless power supply unit wirelessly supplies power to a plurality of devices located within the power supply area.

4. The power supply apparatus according to claim 1, wherein the acquiring unit acquires a plurality of pieces of device information from a plurality of devices located within the communication area, and
wherein the display unit displays statuses of the plurality of devices on the status screen.

5. The power supply apparatus according to claim 1, wherein a battery charging status of the device located within the communication area is displayed on the status screen.

6. The power supply apparatus according to claim 1, wherein the communication area is larger than the power supply area.

7. The power supply apparatus according to claim 1, wherein the power supply apparatus is a printing apparatus capable of performing printing.

8. A method comprising:
wirelessly supplying power to a device located within a power supply area;
acquiring device information from a device located within a communication area; and
displaying, based on the device information acquired by the acquiring unit, a status screen indicating a status of the device located within the communication area,
wherein a changing object for changing the power supply area is displayed on the status screen.

9. A non-transitory computer-readable storage medium which stores instructions that when executed cause a processor to perform processes relating to supplying power, such processes comprising:
wirelessly supplying power to a device located within a power supply area;
acquiring device information from a device located within a communication area; and
displaying, based on the device information acquired by the acquiring unit, a status screen indicating a status of the device located within the communication area,
wherein a changing object for changing the power supply area is displayed on the status screen.

* * * * *